(12) United States Patent
Nakamura et al.

(10) Patent No.: US 6,605,660 B2
(45) Date of Patent: Aug. 12, 2003

(54) POLYARYLENE SULFIDE RESIN COMPOSITION

(75) Inventors: Masaaki Nakamura, Shizuoka (JP); Hiroyuki Amano, Shizuoka (JP)

(73) Assignee: Polyplastics Co., Ltd., Osaka (JP)

( * ) Notice: Subject to any disclaimer, the term of this patent is extended or adjusted under 35 U.S.C. 154(b) by 68 days.

(21) Appl. No.: 09/983,679

(22) Filed: Oct. 25, 2001

(65) Prior Publication Data

US 2002/0082330 A1 Jun. 27, 2002

Related U.S. Application Data

(63) Continuation of application No. 09/509,216, filed as application No. PCT/JP98/04265 on Sep. 22, 1998, now abandoned.

(30) Foreign Application Priority Data

Sep. 29, 1997 (JP) ................................ 9-264576

(51) Int. Cl.[7] .................. C08K 3/22; C08K 9/06; C08L 81/00; C08L 81/04
(52) U.S. Cl. .................. 524/432; 524/609; 523/212
(58) Field of Search ................ 524/432, 434, 524/399, 609; 523/212

(56) References Cited

U.S. PATENT DOCUMENTS

| | | | |
|---|---|---|---|
| 4,176,098 A | 11/1979 | Needham | |
| 4,212,793 A | 7/1980 | Shue | |
| 4,426,479 A | 1/1984 | Deguchi et al. | |
| 4,680,326 A | 7/1987 | Leland et al. | |
| 4,740,425 A | 4/1988 | Leland et al. | |
| 4,820,801 A | 4/1989 | Inoue et al. | |
| 4,841,022 A | 6/1989 | Nakamura et al. | |
| 5,171,480 A | 12/1992 | Yoshinaka et al. | |
| 5,234,770 A | 8/1993 | Nitoh et al. | |
| 5,239,054 A | 8/1993 | Muneto et al. | |
| 5,276,080 A | 1/1994 | Oku | |
| 5,578,659 A | 11/1996 | Anada et al. | |
| 5,610,219 A | 3/1997 | Takatani et al. | |
| 5,792,807 A | 8/1998 | Hayashihara et al. | |
| 5,837,366 A | 11/1998 | Tanaka | |
| 6,299,942 B1 * | 10/2001 | Tamura et al. | 427/304 |

FOREIGN PATENT DOCUMENTS

| | | |
|---|---|---|
| EP | 385278 | 9/1990 |
| JP | 54162752 A | 12/1979 |
| JP | 02105857 A | 4/1980 |
| JP | 57205445 A | 12/1982 |
| JP | 61275353 A | 12/1986 |
| JP | 01217072 A | 8/1989 |
| JP | 03239756 A | 10/1991 |
| JP | 04164961 A | 6/1992 |
| JP | 04225063 A | 8/1992 |
| JP | 06306288 A | 11/1994 |
| JP | 07258543 A | 10/1995 |
| JP | 08151519 A | 6/1996 |

OTHER PUBLICATIONS

Lewis Sr., Richard J; Hawley's Condensed Chemical Dictionary 13th Ed., John Wiley and Sons, New York 1997, p 1180.

* cited by examiner

Primary Examiner—Callie Shosho
(74) Attorney, Agent, or Firm—Burns, Doane, Swecker & Mathis, L.L.P.

(57) ABSTRACT

A polyarylene sulfide resin composition has an excellent moldability to produce moldings excellent in mechanical properties without corroding or staining metal parts such as molds during molding, and comprises 100 parts by weight of a polyarylene sulfide resin (A) and 0.05 to 3 parts by weight of zinc oxide whiskers (B).

15 Claims, No Drawings

POLYARYLENE SULFIDE RESIN COMPOSITION

This application is a continuation of U.S. application Ser. No. 09/509,216, filed on Mar. 24, 2000, now abandoned which was a national stage filing under 35 U.S.C. §371 of International Application No. PCT/JP98/04265 filed on Sep. 22, 1998, which International Application was not published by the International Bureau in English on Oct. 2, 1998. The disclosure of application Ser. No. 09/509,216 is hereby incorporated by reference.

BACKGROUND OF THE INVENTION

1. Technical Field

The present invention relates to an improved polyarylene sulfide resin composition and, more particularly, it relates to a polyarylene sulfide resin composition which has an excellent moldability to produce moldings excellent in mechanical properties without corroding or staining the metal parts such as a die during molding.

2. Prior Art

Polyarylene sulfide (hereinafter abbreviated to PAS) represented by polyphenylene sulfide (hereinafter abbreviated to PPS) has high heat resistance, mechanical properties, chemical resistance, dimensional stability and flame retardancy and, therefore, it has been widely used as a material for electric and electronic instrument parts, for car instrument parts, for chemical instrument parts, etc.

However, this resin has sulfur atoms in its molecular structure and, in addition, the raw material for its manufacture contains sulfur, chlorine and alkali metal such as sodium, whereby the resin has a disadvantage that, during the stage of synthesis of the resin, by-products containing large amounts of sulfur, chlorine, alkali metal, etc. are produced. Accordingly, there is an inconvenience that, upon molding, metal materials such as a die are corroded or stained and, when the resin is used as a material for molded parts, there is a problem that metal which is inserted into the parts and that which is plated or vapor-deposited is corroded or stained, resulting in difficulty.

As means for solving such problems, there has been a proposal where the polymerized PAS resin is deionized with acid, hot water, organic solvent or the like and washed so that the amount of such impurities is reduced to an extent of not more than 500 ppm or even not more than 200 ppm. Although the proposal is considerably effective, the molding processing temperature of the PAS resin and compositions thereof is so high as at least 280° C. or higher. Therefore, even when the resin is purified by means of removal of the impurities, corrosive gas is still generated upon molding and, therefore, its corrosion resistance to metal is insufficient. with regard to an art for solving the problem, there have hitherto been proposals where a capturing agent for the toxic substances is added to the resin so that generation of corrosive impurities is suppressed. Examples of the agent include lithium carbonate (JP-A 54-162752), hydrotalcite (JP-A 61-275353), zinc carbonate, zinc hydroxide (JP-A 2-105857), zinc borate (JP-A 6-306288), etc. However, according to the follow-up studies by the present inventors, it has been found that although some types of the additives showed a certain effect in preventing the corrosion of metals, the effect is not sufficient and, in addition, there is a problem of deterioration in mechanical properties when even a small amount is compounded. In JP-A4-164961, there is an example where a specific zinc oxide is added, but it is still hard to say that the mechanical properties are sufficient. Thus, there has been a demand for further improvements.

Under such circumstances, an object of the present invention is to provide a PAS resin composition where corrosion and staining of the die upon molding of the PAS resin composition and of metal used therefor are improved, mechanical properties such as tensile strength and elongation, impact strength and tenacity are not adversely influenced even by the use of relatively large amount of corrosion inhibitors, and both excellent corrosion resistance to metal and mechanical properties are available.

DISCLOSURE OF THE INVENTION

The present inventors have carried out intensive studies for achieving the above object and have found that, when a specific zinc oxide is compounded with a PAS resin, corrosion or staining to metal can be significantly improved, the adverse influence on mechanical properties due to such a corrosion inhibitor is solved and excellent mechanical properties can be maintained whereby both of the above properties are resulted, leading to the accomplishment of the present invention.

Specifically, the present invention relates to a polyarylene sulfide resin composition characterized by comprising:

(A) 100 parts by weight of a polyarylene sulfide resin composition compounded and melt kneaded with (B) 0.05 to 3 parts by weight of zinc oxide whiskers as fundamental constituting components.

In other words, the present invention relates to a polyarylene sulfide resin composition containing 100 parts by weight of the above (A) and 0.05 to 3 part(s) by weight of the above (B).

DETAILED DESCRIPTION OF THE INVENTION

Constituting components of the present invention will now be described in detail as hereunder.

The PAS resin used as a component (A) in the composition of the present invention is mainly composed of —(Ar—S)—(wherein Ar is an arylene group) as a repeated unit. Examples of the arylene group which may be used include a p-phenylene group, an m-phenylene group, an o-phenylene group, a substituted phenylene group, a p,p'-diphenylenesulfone group, a p,p'-biphenylene group, a p,p'-diphenylene ether group, a p,p'-diphenylene carbonyl group and a naphthalene group. In this case, there are some cases where a copolymer containing different repeated units in the arylene sulfide groups composed of the above-mentioned arylene group is preferred in view of processing properties of the composition, in addition to a homopolymer where the same repeated unit is used.

In the case of a homopolymer, one having a repeating unit of a p-phenylene sulfide group using a p-phenylene group as an arylene group is particularly preferred. In the case of a copolymer, a combination of two or more different groups among the arylene sulfide groups consisting of the above-mentioned arylene groups can be used, and a combination where a p-phenylene group and an m-phenylene group are contained is particularly preferred. Among the above, that containing 70 mole % or more, and preferably 80 mole % or more, of a p-phenylene sulfide group is suitable in view of physical properties such as heat resistance, molding properties and mechanical characteristics.

Among those PAS resins, the use of a high-molecular weight polymer having a substantially straight chain structure obtained by condensation polymerization of a monomer mainly consisting of a bifunctional halogenated aromatic compound is particularly preferred. However, in addition to such a PAS resin having a straight chain structure, it is further possible to use a polymer where a branched or a cross-linked structure is partially formed by using a small amount of monomer such as polyhalogenic aromatic compound having 3 or more halogen substituents in condensation polymerization; and it is furthermore possible to use a polymer where a low-molecular weight polymer having a straight chain structure is heated at high temperature in the presence of oxygen or an oxidizing agent, and the melt viscosity is raised by means of oxidation cross-linking or thermal cross-linking, whereby a molding processability is improved.

With regard to a PAS resin which is the component (A), a mixed system with a branched or cross-linked PAS resin mainly consisting of the above-mentioned straight chain PAS (viscosity at a shear rate of 1200 sec$^{-1}$ at 310° C. is 10 to 300 Pa·s) where a part thereof (1 to 30% by weight; preferably 2 to 25% by weight) has a relatively high viscosity (300 to 3000 Pa·s; preferably 500 to 2000 Pa·s) is suitable as well.

The preferred PAS resin used in the present invention is that, after polymerization, a deionizing treatment such as washing with acid, hot water, organic solvent or a combination thereof is carried out to purify by removing the impurities formed as by-products so that each amount of chlorine and alkali metal is made not more than 500 ppm, and preferably not more than 300 ppm.

Next, with regard to zinc oxide whiskers used as a component (B) in the present invention; the preferred one is that having an average fiber diameter at its needle area (shorter diameter) and an average fiber length (long diameter) as microscopically measured are 0.1 to 5 μm and 2 to 100 μm, respectively, and an average aspect ratio is 5 or more. In the commercially available products, there is a zinc oxide product having a three-dimensional shape of tetrapods and that is one of the suitable compounds as whiskers having the already-mentioned shape although this does not mean a limitation thereto.

The compounding amount of the above component (B) to 100 parts by weight of the polyarylene sulfide resin is 0.05 to 3 parts by weight, and preferably 0.1 to 1 part by weight. When the amount is less than 0.05 part by weight, effects of preventing the corrosion or suppressing the staining to metal are not sufficient while, when the amount is more than 3 parts by weight, it is not possible to maintain the same mechanical properties as in the case where no component (B) is compounded.

Moreover, in view of maintaining the dispersibility and the mechanical properties, it is preferred that the surface of the zinc oxide whiskers is previously treated with epoxyalkoxysilane and/or aminoalkoxysilane. As the epoxyalkoxysilane, any substance is effective so far as it is a silane compound having one or more epoxy groups and two or three alkoxy groups in a molecule and as its examples may be mentioned γ-glycidoxypropyl trimethoxysilane and γ-glycidoxypropyl triethoxy silane. As the aminoalkoxysilane, any substance is effective so far as it is a silane compound having one or more amino groups and two or three alkoxy groups in a molecule, and as its examples maybe mentioned γ-aminopropyl trimethoxysilane, γ-aminopropyl triethoxysilane and N-(β-aminoethyl)-γ-aminopropyl trimethoxysilane.

It is preferred that the compounding amount of such an alkoxy silane to the zinc oxide whiskers as the component (B) is 0.05 to 5% by weight.

In the present invention, it is preferred to compound phosphoric acid, hypophosphorous acid or a salt thereof, whereby resistance to wet heat for a long period can be improved.

As examples of the phosphoric acid, hypophosphorous acid and a salt thereof used here as the component (C) may be mentioned at least one or more compounds selected from primary phosphoric acid, hypophosphorous acid and salts thereof with zinc, alkali metal or alkaline earth metal, such as calcium primary phosphate, sodium primary phosphate, calcium hypophosphite, zinc hypophosphite, magnesium hypophosphite and sodium hypophosphite, and preferred are calcium hypophosphite, magnesium hypophosphite and zinc hypophosphite. Compounding amount of the above-mentioned component (C) to 100 parts by weight of the polyarylene sulfide resin (A) is 0.05 to 2 part(s) by weight, and preferably 0.1 to 1 part by weight. When the amount is too small, the aimed effect of improving the resistance to wet heat for a long period is not achieved, while, when it is too much, there is a problem of generation of gas during the molding.

It has been unexpectedly confirmed that, when the above-mentioned components (C) coexists with the component (B), resistance to wet heat for a long period is improved as a result of their interaction without deteriorating the effects of the component (B), i.e., an effect for preventing corrosion or an effect for suppressing staining to metal. Although the component (C) is effective even when compounded as it is, a method where a part of or all of this component is previously attached to an inorganic or organic filler which is a component (D) mentioned later and then compounded with other components is effective as well. There is no particular limitation for a method of adhering the component (C) and, for example, a solution containing the above compound may be sprayed on a filler to attach or, in the case of glass fiber or the like, the above solution may be applied using a roll coater to attach. It is also possible to treat together with a coupling agent such as aminosilane and epoxysilane or an epoxy resin-based or urethane resin-based sizing agent commonly used as a surface treating agent for glass fiber or the like.

The inorganic or organic filler which is used as the component (D) in the present invention is not always an essential component. However, in order to prepare a molded product having an excellent properties such as mechanical strength, heat resistance, dimensional stability (against warp and deformation), electric properties, etc., it is preferred that the component (D) is compounded, and, in this case, a filler in the form of fiber, granules or plate or a mixture thereof is used depending upon the particular object.

As examples of a fibrous filler may be mentioned glass fiber, asbestos fiber, carbon fiber, silica fiber, silica-alumina fiber, zirconia fiber, boron nitride fiber, silicon nitride fiber, boron fiber and potassium titanate fiber, and as its additional examples may be mentioned inorganic fibrous substances such as fiberous materials of metal such as stainless steel, aluminum, titanium, copper and brass. Particularly representative fibrous fillers are glass fiber, carbon fiber and potassium titanate fiber. It is also possible to use a high-melting point organic fibrous substance such as aromatic polyamide, acrylic resin and fluorocarbon resin.

As examples of a granular filler may be mentioned carbon black, graphite, silicate such as silica, quartz powder, glass beads, glass powder, calcium silicate, aluminum silicate, kaolin, talc, clay, diatomaceous earth and wollastonite, metal oxide such as iron oxide, titanium oxide and alumina, metal carbonate such as calcium carbonate and magnesium carbonate, metal sulfate such as calcium sulfate and barium sulfate, and others such as silicon carbide, silicon nitride and various metal powders. Particularly representative are carbon black, silica, glass beads or glass powder, calcium carbonate, talc, etc.

As examples of a filler in a form of plate may be mentioned mica, glass flakes and various metal foils.

These fillers may be used either alone or in combination of two or more. A combination use of a fibrous filler (particularly, glass fiber or carbon fiber) with a filler in the form of granules or plate is a particularly preferred combination in view of achieving all of the mechanical strength, dimensional precision, electric properties, etc., together.

In using such a filler, it is desirable to use the filler after being subjected to a surface treatment or a sizing treatment using a surface treating agent or a sizing agent if and when necessary. Examples of the agent for such a treatment include functional compounds such as epoxy-based compounds, isocyanate-based compounds, silane-based compounds and titanate-based compounds.

Compounding amount of the above-mentioned component (D) to the total amount of the composition is 1 to 75% by weight, and preferably 3 to 70% by weight. When the amount is too much, a molding operation is difficult and, in addition, a problem is resulted in the mechanical strength of the molded product.

Further, in the composition for the molded product used in the present invention, it is also possible to appropriately add the known substances which are commonly added to thermoplastic resins, that is, stabilizers such as antioxidants and ultraviolet absorbers, flame retardants, coloring agents such as dyes and pigments, lubricants, crystallization accelerators and crystal nucleating agents depending upon the requested properties.

The preparation of the resin composition of the present invention may be carried out by the devices and the methods which are commonly used for the preparation of synthetic resin compositions. In general, the necessary components are mixed and the mixture is melted, kneaded and extruded using a uniaxial or biaxial extruder to prepare pellets for molding. Another method in which the resin component is melted and extruded and, during its process, an inorganic component such as glass fiber is added is one of the preferred methods as well.

The pellets of the materials prepared as above can be molded by commonly known molding methods for thermoplastic resins such as injection molding, extrusion molding, vacuum molding and compression molding, with an injection molding being most preferred.

EXAMPLES

Now, the present invention will be specifically illustrated by way of the following Examples and Comparative Examples although the present invention is not limited thereto.

Examples 1 to 14 and Comparative Examples 1 to 10

The components (B) as shown in Tables 1 and 2 were added to 100 parts of a substantially linear polyphenylene sulfide resin ("Fortron KPS" manufactured by Kureha Chemical Industry; viscosity: 50 Pa·s (310° C., 1200 sec$^{-1}$)) which was the component (A) and mixed for 2 minutes using a Henschel mixer. Then, the components (C) and (D) were added thereto in the amounts as shown in Tables 1 and 2 and mixed for 30 second using a blender. The mixture was kneaded using an extruder where the cylinder temperature was 310° C. to prepare pellets of a polyphenylene sulfide resin composition. The pellets were subjected to measurements of corrosiveness to metals, mechanical characteristics and a long-term resistance to wet heat. The results are shown in Tables 1 and 2.

Example 15

A composition was prepared under the same conditions as in the above-mentioned Examples and then evaluated, except that the glass fiber as the component (D) was used after being applied with a solution of calcium hypophosphite (C), dissolved in a solvent in such a ratio as shown in Table 2 and well dried to attach thereon. The results of the evaluation are shown in Table 2.

Incidentally, the methods for the evaluation were as follows.

Corrosiveness

The above pellets (4 g) was placed on a bottom of a test tube (inner diameter: 18 mm; height: 160 mm) and a test piece (15×160×2 mm) of a die material (SKD-11) mainly consisting of iron, chromium and carbon was hung at the predetermined position. The top of the test tube was stoppered, and the test tube was heated at 320° C. for 3 hours. Then, the test piece was taken out, the state of corrosion was observed by naked eyes and under a microscope to check the corroded state, and the following relative ranking was carried out for the degree of the corroded state.

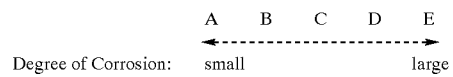

Tensile Strength and Elongation

A piece for the tensile test was molded by an injection molding machine where a cylinder temperature was 320° C. and a die temperature was 150° C. and the test piece was subjected to the measurement of tensile strength and tensile elongation according to ASTM D-638.

Long-term Resistance to Wet Heat

A piece for the tensile test was molded by an injection molding machine where a cylinder temperature was 320° C. and a die temperature was 150° C. and the test piece was treated in hot water of 95° C. for 500 hours and subjected to the measurement of tensile strength according to ASTM D-638.

TABLE 1

| | Composition | | | | | | | Evaluation | | | |
|---|---|---|---|---|---|---|---|---|---|---|---|
| | PPS (A) | Corrosion Inhibitor (B) | | Component (C) | | Filler (D) | | | Tensile Strength | Tensile Elongation | Tensile Strength after Wet Heat |
| | wt. parts | type | wt. parts | type | wt. parts | type | wt. parts | Corrosiveness | (MPa) | (%) | Treatment (MPa) |
| Example 1 | 100 | B-1 | 0.05 | — | — | — | — | C | 89 | 4.9 | 89 |
| Example 2 | 100 | B-1 | 0.5 | — | — | — | — | A | 90 | 5.0 | 90 |
| Example 3 | 100 | B-1 | 1 | — | — | — | — | A | 90 | 5.0 | 90 |
| Comp. Ex. 1 | 100 | — | — | — | — | — | — | E | 89 | 4.8 | 89 |
| Example 4 | 100 | B-1 | 0.05 | — | — | glass fiber | 40 | B | 190 | 1.9 | 133 |
| Example 5 | 100 | B-1 | 0.5 | — | — | glass fiber | 40 | A | 190 | 1.9 | 133 |
| Example 6 | 100 | B-1 | 1 | — | — | glass fiber | 40 | A | 189 | 1.8 | 132 |
| Example 7 | 100 | B-1 | 3 | — | — | glass fiber | 40 | A | 189 | 1.7 | 131 |
| Example 8 | 100 | B-1 | 0.5 | — | — | glass fiber | 30 | A | 135 | 1.1 | 95 |
| | | | | | | Ca carbonate | 30 | | | | |
| Example 9 | 100 | B-2 | 0.5 | — | — | glass fiber | 40 | A | 189 | 1.9 | 132 |
| Example 10 | 100 | B-3 | 0.5 | — | — | glass fiber | 40 | A | 184 | 1.7 | 128 |
| Example 11 | 100 | B-1 | 0.5 | C-1 | 0.3 | glass fiber | 40 | A | 190 | 1.9 | 181 |
| Example 12 | 100 | B-1 | 1 | C-1 | 0.3 | glass fiber | 40 | A | 189 | 1.8 | 180 |
| Example 13 | 100 | B-1 | 0.5 | C-1 | 0.3 | glass fiber | 30 | A | 135 | 1.1 | 127 |
| | | | | | | Ca carbonate | 30 | | | | |

TABLE 2

| | Composition | | | | | | | Evaluation | | | |
|---|---|---|---|---|---|---|---|---|---|---|---|
| | PPS (A) | Corrosion Inhibitor (B) | | Component (C) | | Filler (D) | | | Tensile Strength | Tensile Elongation | Tensile Strength after Wet Heat |
| | wt. parts | type | wt. parts | type | wt. parts | type | wt. parts | Corrosiveness | (MPa) | (%) | Treatment (MPa) |
| Comp. Ex. 2 | 100 | — | — | — | — | glass fiber | 40 | E | 190 | 1.9 | 133 |
| Comp. Ex. 3 | 100 | B-4 | 0.5 | — | — | glass fiber | 40 | A | 152 | 1.3 | 106 |
| Comp. Ex. 4 | 100 | B-5 | 0.5 | — | — | glass fiber | 40 | A | 161 | 1.4 | 113 |
| Comp. Ex. 5 | 100 | B-6 | 0.5 | — | — | glass fiber | 40 | A | 162 | 1.4 | 113 |
| Comp. Ex. 6 | 100 | $ZnCO_3$ | 0.5 | — | — | glass fiber | 40 | A | 164 | 1.4 | 107 |
| Comp. Ex. 7 | 100 | $Li_2CO_3$ | 0.5 | — | — | glass fiber | 40 | B | 166 | 1.4 | 116 |
| Comp. Ex. 8 | 100 | $CaCO_3$ | 0.5 | — | — | glass fiber | 40 | E | 181 | 1.7 | 129 |
| Comp. Ex. 9 | 100 | — | — | — | — | glass fiber | 30 | D | 135 | 1.1 | 95 |
| | | | | | | Ca carbonate | 30 | | | | |
| Ex. 14 | A-1 100 | B-1 | 0.05 | — | — | glass fiber | 40 | B | 188 | 1.9 | 132 |
| Comp. Ex. 10 | A-1 100 | — | — | — | — | glass fiber | 40 | D | 188 | 1.9 | 132 |
| Example 15 | 100 | B-1 | 0.5 | C-1 | 0.3 | glass fiber | 40 | A | 190 | 1.9 | 183 |

Notes:

(A) PPS
(A-1): PPS which was subjected to a deionizing treatment was used.

(B) Corrosion Inhibitor
(B-1): Zinc oxide whiskers (treated with epoxysilane) manufactured by Matsushita Amtech; average fiber diameter (short diameter)=0.3 μm, average fiber length (long diameter)=4 μm
(B-2): Zinc oxide whiskers (treated with aminosilane) manufactured by Matsushita Amtech; average fiber diameter (short diameter)=0.3 μm, average fiber length (long diameter)=4 μm
(B-3): zinc oxide whiskers (untreated) manufactured by Matsushita Amtech; average fiber diameter (short diameter)=0.3 μm, average fiber length (long diameter)=4 μm
(B-4): Zinc oxide (by a dry method) manufactured by Mitsui Mining and Smelting; average particle size=0.7 μm
(B-5): Zinc oxide (by a dry method) manufactured by Sakai Chemical Industry; average particle size=0.04 μm
(B-6): Zinc oxide (by a wet method) manufactured by Sakai Chemical Industry; average particle size 0.02 μm (C) Component
(C-1): Calcium hypophosphite

What is claimed is:

1. A polyarylene sulfide resin composition suitable for molding to form a molded article having improved mechanical properties without corroding or staining a metal part in contact with the composition during such molding comprising (A) 100 parts by weight of a polyarylene sulfide resin and (B) 0.05 to 3 part weight of zinc oxide whiskers.

2. The composition according to claim 1 which further contains (C) 0.05 to 2 parts by weight, for 100 parts by weight of the polyarylene sulfide resin (A), of at least one member selected from the group consisting of phosphoric acid, hypophosphorous acid and a salt thereof.

3. The composition according to claim 2 wherein the component (C) is a hypophosphite.

4. The composition according to claim 2 which further contains (D) 1 to 75% by weight, based on the whole composition, of an inorganic or organic filler selected from the group consisting of granular fillers, platy fillers, fibrous fillers other than the component (B), and mixtures thereof.

5. The composition according to claim 2, wherein the zinc oxide whiskers have an average fiber diameter at its needle area of 0.1 to 5 μm, an average fiber length of 2 to 10 μm, and an average aspect ratio of at least 5.

6. The composition according to claim 2, wherein the zinc oxide whiskers have a three-dimensional shape of tetrapods.

7. The composition according to claim 2, wherein the zinc oxide whiskers are present at 0.1 to 1 part by weight.

8. The composition according to claim 1 which further contains (D) 1 to 75% by weight, based on the whole composition, of an inorganic or organic filler selected from the group consisting of granular fillers, platy fillers, fibrous fillers other than the component (B), and mixtures thereof.

9. The composition according to claim 8, wherein the component (D) comprises 3 to 70% by weight of glass fibers or carbon fibers.

10. The composition according to claim 1, wherein the surface of the zinc oxide whisker as the component (B) has been treated with at least one member selected from the group consisting of an epoxyalkoxysilane and an aminoalkoxysilane.

11. The composition according to claim 1, wherein the polyarylene sulfide resin (A) is obtained by polymerization followed by a deionizing treatment to yield the polyarylene sulfide resin (A) having a chlorine content of 500 ppm or less and an alkali metal content of 500 ppm or less.

12. The composition according to claim 1, wherein the zinc oxide whiskers have an average fiber diameter at its needle area of 0.1 to 5 µm, an average fiber length of 2 to 10 µm, and an average aspect ratio of at least 5.

13. The composition according to claim 1, wherein the zinc oxide whiskers have a three-dimensional shape of tetrapods.

14. The composition according to claim 1, wherein the zinc oxide whiskers are present at 0.1 to 1 part by weight.

15. The composition according to claim 1, comprising (A) 100 parts by weight of a polyarylene sulfide resin, and (B) 0.05 to 1 part by weight of the zinc oxide whiskers.

\* \* \* \* \*